(12) United States Patent
Babej et al.

(10) Patent No.: US 10,197,079 B2
(45) Date of Patent: Feb. 5, 2019

(54) SHEET METAL ELEMENT HAVING A HOLE, SHEET METAL PART AND COMPONENT ASSEMBLY AS WELL AS MANUFACTURING METHOD

(71) Applicant: PROFIL Verbindungstechnik GmbH & Co. KG, Friedrichsdorf (DE)

(72) Inventors: Jiri Babej, Lich (DE); Oliver Diehl, Bad Homburg v.d.H. (DE); Richard Humpert, Bad Nauheim (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 201 days.

(21) Appl. No.: 15/049,655

(22) Filed: Feb. 22, 2016

(65) Prior Publication Data

US 2016/0252118 A1    Sep. 1, 2016

(30) Foreign Application Priority Data

Feb. 27, 2015   (DE) .......................... 10 2015 102 865

(51) Int. Cl.
*F16B 37/06*   (2006.01)
*F16B 5/02*   (2006.01)
(Continued)

(52) U.S. Cl.
CPC ............ *F16B 5/0208* (2013.01); *B21D 28/26* (2013.01); *F16B 5/04* (2013.01); *F16B 37/048* (2013.01);
(Continued)

(58) Field of Classification Search
CPC .......... F16B 5/04; F16B 5/045; F16B 37/065; F16B 37/062; F16B 37/068
(Continued)

(56) References Cited

U.S. PATENT DOCUMENTS 2,672,069 A    3/1954   Mitchell
3,181,584 A    5/1965   Borowsky
(Continued)

FOREIGN PATENT DOCUMENTS

DE    3102263 A1    12/1981
DE    102011001522 A1    9/2012
(Continued)

OTHER PUBLICATIONS

German Search Report for related German Application No. 102015102865.4, dated Sep. 24, 2015, pp. 8.

*Primary Examiner* — Flemming Saether
(74) *Attorney, Agent, or Firm* — Cantor Colburn LLP (57) ABSTRACT

A finished component assembly includes a sheet metal part, a sheet metal element and a rivet element. The rivet element is provided with a head part of larger diameter, which serves as a thread carrier and which forms a sheet metal contact surface, as well as with a hollow cylindrical rivet section of smaller diameter. The rivet section projects from the head part at the side of the sheet metal contact surface and extends through an aperture and a collar of the sheet metal part as well as through a hole of the sheet metal element and is shaped into an at least L-shaped, preferably U-shaped, rivet bead at the side of the sheet metal element remote from the sheet metal part, with the sheet metal contact surface contacting the side of the sheet metal part remote from the sheet metal element.

15 Claims, 4 Drawing Sheets

(51) Int. Cl.
  *F16B 5/04* (2006.01)
  *B21D 28/26* (2006.01)
  *F16B 37/04* (2006.01)
  *F16B 43/00* (2006.01)

(52) U.S. Cl.
  CPC .......... *F16B 37/065* (2013.01); *F16B 37/068* (2013.01); *F16B 43/00* (2013.01)

(58) Field of Classification Search
  USPC .......................................... 411/501, 181, 533
  See application file for complete search history.

(56) References Cited

U.S. PATENT DOCUMENTS

| | | | | |
|---|---|---|---|---|
| 3,824,675 A * | 7/1974 | Ballantyne | ........... | B21D 39/034 29/445 |
| 4,557,651 A * | 12/1985 | Peterson | ................ | B21D 39/03 29/524.1 |
| 4,615,098 A * | 10/1986 | Come | ................ | B21D 39/044 285/330 |
| 5,308,285 A * | 5/1994 | Malen | ................ | B21H 3/02 411/368 |
| 5,499,440 A * | 3/1996 | Satoh | .................... | B21K 25/00 29/512 |
| 6,004,087 A * | 12/1999 | Muller | ................ | F16L 337/068 411/107 |
| 6,082,942 A * | 7/2000 | Swick | .................... | H01R 4/304 411/160 |
| 6,918,170 B2 * | 7/2005 | Luthi | .................... | B21D 39/034 29/509 |
| 7,160,047 B2 * | 1/2007 | Mueller | ................ | B23P 19/062 29/512 |
| 7,996,977 B2 * | 8/2011 | Herb | .................... | B21D 39/034 29/432.2 |
| 8,545,157 B2 * | 10/2013 | Golovashchenko | ... | B21D 19/14 16/2.1 |
| 9,151,312 B2 * | 10/2015 | Diehl | ................ | F16L 337/065 29/509 |
| 2015/0059156 A1 * | 3/2015 | Diehl | ...................... | B21J 15/04 29/509 |

FOREIGN PATENT DOCUMENTS

| | | |
|---|---|---|
| DE | 102013217640 A1 | 3/2015 |
| EP | 957273 B1 | 11/1999 |
| EP | 759510 B1 | 3/2000 |
| EP | 2484924 A1 | 8/2012 |
| GB | 545367 A | 5/1942 |

* cited by examiner

SHEET METAL ELEMENT HAVING A HOLE, SHEET METAL PART AND COMPONENT ASSEMBLY AS WELL AS MANUFACTURING METHOD

BACKGROUND

The present invention relates to a sheet metal element having a hole, to a sheet metal part and to a component assembly as well as to a manufacturing method; the invention in particular concerns a sheet metal element having a hole for use in a component assembly with a sheet metal part and a rivet element.

Efforts are being made in the manufacture of cars to fasten components which are relevant to safety, such as seat fastenings, to relatively thin sheet metal parts of, for example—and without any restriction—1.0 to 1.5 mm thickness and any desired strength, for example approximately 500 MPa, and indeed in an arrangement in which the head part of the fastening element is arranged above a relatively thin sheet metal base panel and the rivet bead is arranged beneath the sheet metal base panel. This means the screwing on forces act upwardly in a perpendicular manner and attempt to pull the rivet bead through the sheet metal part. As the sheet metal part is relatively thin and for this reason does not have any pronounced local rigidity, it is difficult to find a construction which, on the one hand, can be integrated into the manufacturing process of the sheet metal base panel and, on the other hand, has a sufficient rigidity in the event of an accident in order to the avoid the tearing out of the seat anchorage.

It is the object of the present invention to provide a remedy in this case.

This is achieved in accordance with the invention in that a sheet metal element, in particular a planar sheet metal element, is provided for the local stiffening of the sheet metal part, wherein the hole margin of the sheet metal element is provided with at least one radially inwardly directed projection which forms an undercut. The sheet metal element can hereby be attached to the sheet metal part in a shape locked manner in a first manufacturing process in that sheet metal material of the sheet metal part is brought into the hole of the sheet metal element and brought into engagement with the undercut so that the sheet metal element is held captively at the sheet metal part.

In principle, it would be sufficient if only one radially inwardly directed peripheral projection, i.e. a peripheral undercut, is provided at the hole margin of the sheet metal element. However, an arrangement is preferred in which the sheet metal element and at least one undercut are provided at both sides of the plane in the hole margin with respect to a plane which is symmetrically formed perpendicular to the central longitudinal axis of the hole at half the height of the hole.

Since such a symmetrical sheet metal element is used, it is not important with which orientation the sheet metal element is attached to the sheet metal part, i.e. with which of the two end faces the sheet metal element contacts the sheet metal part. This signifies a substantial simplification of the manufacturing process since the sheet metal elements can be removed from a loose bulk of such sheet metal elements without having to ensure a particular orientation.

It is particularly preferred if a plurality of locally formed, radially inwardly directed projections which form undercuts are provided and are, for example, provided at both sides of said plane.

Such projections which form undercuts can be formed by respective wedge-shaped recesses extending in particular radially to the central longitudinal axis of the hole in an end face or in both end faces of the sheet metal element, with the greatest depth being present at the hole margin. Such wedge-shaped recesses which are reshaped into radially inwardly directed projections or noses which form undercuts can be seen from EP-B-759510. However, in the EP document, they are formed in the side wall of an end-face recess of a fastening element and not in the hole wall of a sheet metal element.

Such projections or noses which form undercuts can also be formed by at least one impression which extends in wave shape about the central longitudinal axis and which is provided in an end face of the sheet metal element adjacent to the hole margin, preferably by respective wavy impressions provided in the two end faces of the sheet metal element. Such wavy impressions which lead to the formation of radially inwardly directed projections which form undercuts are known from EP-B-957273.

It is in particular preferred if the sheet metal element has the shape of a circular metal washer. Such metal washers can be manufactured inexpensively from sheet metal material and the formation of the radially inwardly directed projections which form the undercuts can be integrated in a cost-effective manner in the process of manufacturing the metal washers.

SUMMARY OF THE INVENTION

The present invention further concerns a sheet metal part for use in a first component assembly having a sheet metal element in accordance with the invention as described above and has the special characteristic that the sheet metal part is provided with an aperture whose border is shaped into a collar which projects from the plane of the sheet metal part, which is formed into the hole of the sheet metal element and which is in engagement with at least one of the undercuts, whereby the sheet metal element is captively attached to the sheet metal part.

Such locally formed, radially inwardly directed projections or noses which form undercuts are also particularly advantageous because they are in engagement with the material of the collar and between the sheet metal part and the sheet metal element not only prevent an axial separation of the sheet metal element and the sheet metal part, wherein the term axial is here to be understood with respect to the central longitudinal axis of the hole of the sheet metal element or of the collar, but at the same time also form a security against rotation between the sheet metal element and the sheet metal part.

The present application further concerns a finished component assembly including a sheet metal part having an attached sheet metal element as described above together with a rivet element, wherein the finished component assembly is characterized in that the rivet element is provided with a head part of larger diameter, which serves as a thread carrier and which forms a sheet metal contact surface, as well as with a hollow cylindrical rivet section of smaller diameter which projects from the head part at the side of the sheet metal contact surface, which extends through the aperture and the collar of the sheet metal part as well as through the hole of the sheet metal element and which is shaped into an at least L-shaped, preferably U-shaped, rivet bead at the side of the sheet metal element remote from the sheet metal part, with the sheet metal contact surface contacting the side of the sheet metal part remote from the sheet metal element.

The component assembly configured in this way is able to take up the normal loads which occur in the example of a car seat during normal operation, for example the forces which occur when the vehicle is accelerated or the centrifugal forces which occur during cornering or the forces which prevail when the vehicle brakes, in particular when the driver presses on the brake pedal, without the rivet element being buttoned out or tearing out of the sheet metal base panel. The component assembly in accordance with the invention is furthermore able to withstand the forces which occur in the event of an accident so that the seat is not torn out of the anchorage. This is prevented by the local stiffening of the floor panel achieved by the sheet metal element in that a conical deformation of the sheet metal part with widening of the hole of the sheet metal part does not occur to the extent that the rivet bead can pass through the widened hole, whereby the seat would no longer be anchored in the vehicle.

It is further of advantage that the attachment of the rivet element to the sheet metal part takes place in a separate method step from the attachment of the sheet metal element to the sheet metal part. Thus the manufacture of the component assembly can, for example, take place in two consecutive steps in a progressive tool or in different tools of a transfer line or even in different workshops.

It is in particular favorable if the rivet bead radially overlaps the sheet metal element at the end face of the sheet metal element remote from the sheet metal part, measured from the hole margin, by at least the radial thickness of the cylindrical rivet section. It can hereby be ensured that the maximum strength of the cylindrical part of the rivet section is available and that the forces which prevail in the event of an accident are not sufficient to reshape the rivet bead in such a manner that the rivet element is pulled out through the sheet metal element and the sheet metal part.

The rivet element is preferably provided with features providing security against rotation in the region of the sheet metal contact surface and/or in the region of the rivet section, said features providing security against rotation being reflected in the sheet metal part or in its collar and ensuring the attachment of the rivet element to the sheet metal part in a manner secure against rotation. The attachment of the rivet element to the sheet metal part in a manner secure against rotation is thereby ensured. It is also of advantage that the sheet metal element is anyway attached to the sheet metal part in a manner secure against rotation. This is, however, not absolutely necessary since the hole of the sheet metal element stiffens the collar of the sheet metal part in such a manner that the features providing security against rotation at the rivet element are anyway sufficient to ensure the required security against rotation with respect to the sheet metal part. This is also the explanation as to why a peripheral radial projection at the hole margin of the sheet metal part, which forms a peripheral undercut for the collar material, is sufficient in order to attach the sheet metal element in a captive manner to the sheet metal part without a particular security against rotation taking place between these parts.

The rivet element used in the component assembly can be a nut element whose inner thread is provided in the head part or is supported by said head part. Alternatively to this, the rivet element used in the component assembly can be a bolt element whose shaft part having an external thread projects away from or is carried by the head part at the side remote from the rivet section.

The present invention further concerns a method of manufacturing a first component assembly including a sheet metal part and a sheet metal element in accordance with claim 13, in which the sheet metal part is punched, is reshaped to form the collar and is brought radially toward the hole margin and brought into engagement with the undercut or with the undercuts or with at least some of the undercuts.

Furthermore, the present invention also concerns a method in accordance with claim 14 in which, for the manufacture of the finished component assembly, the cylindrical rivet section of the rivet element is guided from the side of the sheet metal part remote from the sheet metal element through its aperture and collar and through the hole of the sheet metal element until the sheet metal contact surface contacts the sheet metal part and the features providing security against rotation move into engagement with the sheet metal part and/or the inner side of the collar and in that the region of the rivet section is shaped into an at least L-shaped, preferably U-shaped, rivet bead at the side of the sheet metal element remote from the sheet metal part, with the rivet bead radially overlapping the end face of the sheet metal element remote from the sheet metal part, when measured from the hole margin, by at least the radial thickness of the cylindrical rivet section. The process of attaching the sheet metal part to the sheet metal element for forming a first component assembly and the process of attaching the rivet element to the first component assembly for forming a finished component assembly can take place in different stages, in particular consecutive stages, of a progressive tool, whereby the finished component assembly can be manufactured inexpensively. Alternatively to this, the first component assembly and subsequently the finished component assembly can be produced in a transfer system. A manufacture of the first component assembly and of the finished component assembly is also possible in different workshops or halls as the sheet metal element is held captively at the sheet metal part.

BRIEF DESCRIPTION OF THE DRAWINGS

The invention will be described in more detail in the following with reference to embodiments and to the enclosed drawings in which are shown.

In all the Figures, the letter L indicates the central longitudinal axis of the respective shown part or of the respective shown parts.

DETAILED DESCRIPTION

Figure 1:
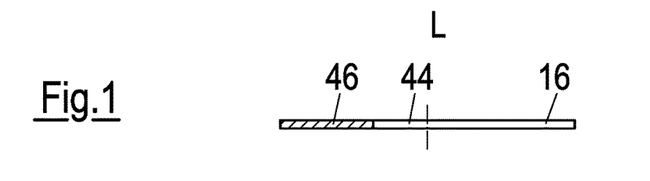
FIG. 1 a partly sectioned portion of a pre-punched sheet metal part.
Figure 2:
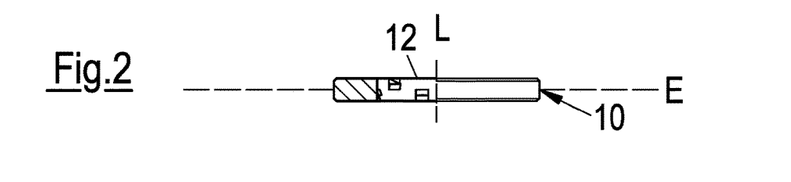
FIG. 2 a partly sectioned side view of a sheet metal element in accordance with the invention.
Figure 4A:
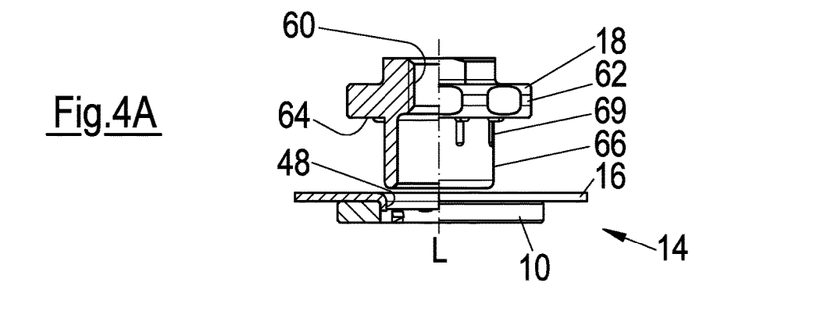
FIG. 4A a partly sectioned illustration of the first phase of the attachment of a rivet element to the component assembly of FIG. 3.
Figure 4B:
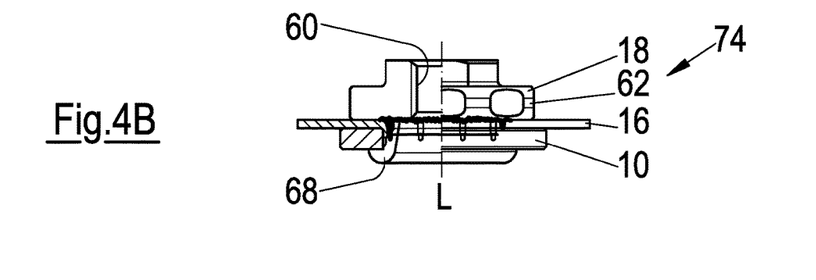
FIG. 4B a partly sectioned illustration of the second phase of the attachment of the rivet element of FIG. 4B to the component assembly of FIG. 3 for the manufacture of a completed further component assembly which can be seen in FIG. 4B.

An important aspect of the present application is the sheet metal element 10 having a hole 12 for use in a first component assembly 14 in accordance with FIG. 4B together with a sheet metal part 16 in accordance with FIG. 1. The first component assembly 14 is joined with a rivet element 18 to form a finished component assembly 74 prior to the attachment to the sheet metal part 16 (which can be seen per se from FIG. 4A). The sheet metal element 10 in accordance with FIG. 2 as well as the sheet metal elements of FIGS. 5A to 5C, 5D, 6A and 6B all have the special characteristic that the hole margin 20 of the sheet metal element 10 is provided with at least one radially inwardly directed projection 24 which forms an undercut 22.

Having regard to the mentioned sheet metal elements having holes in accordance with FIG. 2 or FIGS. 5A to 5C, 5D, 6A and 6B, it can be seen that the element is symmetrical with respect to a plane E, which is formed perpendicular to the central longitudinal axis L of the hole at half the height of the hole, and is provided with at least one projection 24 at the hole margin 20 which forms an undercut 22 at both sides of the plane E.

It is in particular favorable if—as shown in FIGS. 2, 5A to 5C, 5D and 6B—a plurality of radially inwardly directed projections 24 which form undercuts 22 are provided and are, for example, provided at both sides of said plane E. Even in FIG. 6A, in which only one radially inwardly directed peripheral projection 24 (which can also be called a ring nose) provided at the hole margin 20 is present, two undercuts 22 are formed which are present above and beneath the plane E in each case. In this respect, the lower undercut is active when the sheet metal part contacts the upper end face 30 of the sheet metal element. The upper undercut 22 then becomes active when the sheet metal element is turned over such that the lower end face 30 in this case comes to lie at the top.

A particularly preferred sheet metal element 10, namely the sheet metal element in accordance with FIG. 2 or FIGS. 5A to 5C, is characterized in that the undercuts 22 are formed by respective wedge-shaped recesses 28 extending in particular radially to the central longitudinal axis of the hole in the end face 30 or in the end faces 30 of the sheet metal element 10, with the greatest depth being present at the hole margin 20. The undercuts 22 arise due to the radially inwardly directed projections 24 which are formed by the manufacture of the wedge-shaped recesses 28 in the end faces 30.

Figure 5A:
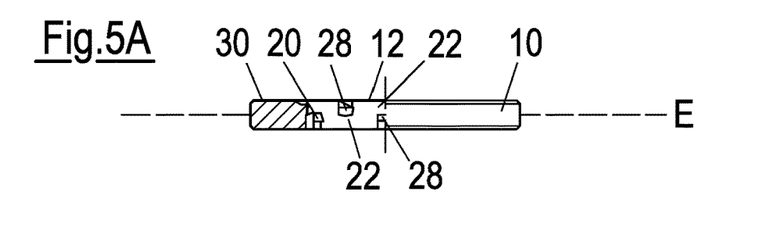
FIG. 5A the same sheet metal element as in FIG. 2.
Figure 5B:
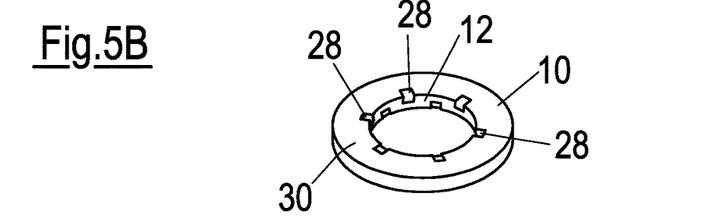
FIG. 5B a perspective illustration of the sheet metal element of FIG. 5A.
Figure 5C:
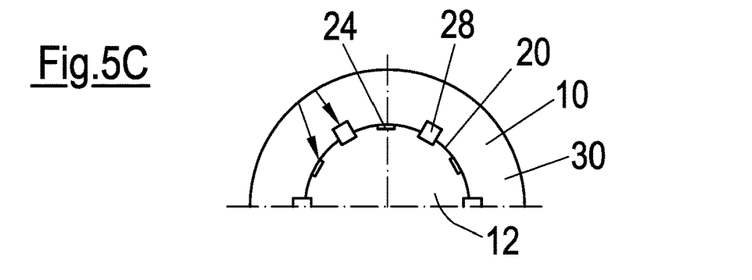
FIG. 5C a half plan view of the sheet metal element of FIG. 5A.
Figure 5D:
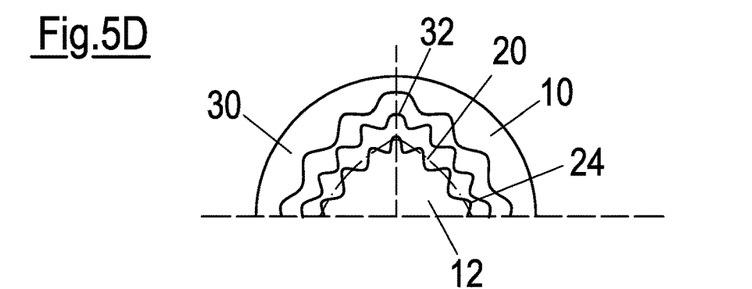
FIG. 5D a modified form of the sheet metal element in accordance with FIG. 5A in an illustration corresponding to FIG. 5D.
Figure 6A:
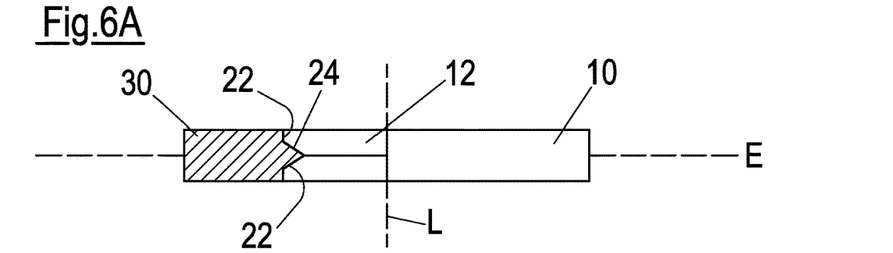
FIG. 6A an illustration of an alternative form of the sheet metal element of FIG. 2 with a peripheral inwardly directed projection which forms an undercut at the hole margin of the sheet metal element.
Figure 6B:
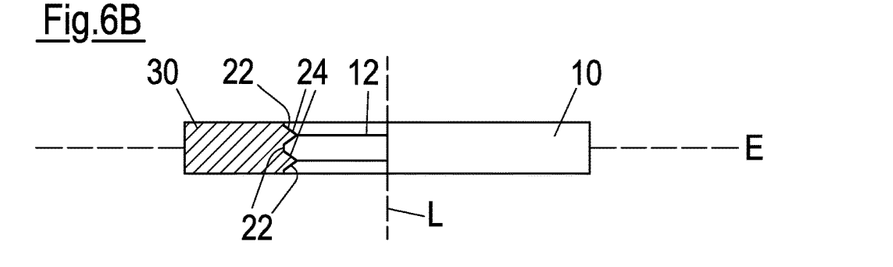
FIG. 6B an illustration of a further alternative form of the sheet metal element of FIG. 2 with two peripheral inwardly directed projections which form respective undercuts at the hole margin of the sheet metal element.

The embodiment of the sheet metal part 10 in accordance with FIG. 5D likewise has undercuts 22 beneath the projections or noses 24, which correspond to those of the embodiment in accordance with FIG. 2 or FIGS. 5A to 5C; however, in this case, the undercuts arise due to the projections 24 which are formed by the wavy recesses 32 which extend about the central longitudinal axis L and which are pressed into the end faces 30 of the sheet metal part 10. In FIG. 5D, the wavy recess can only be seen in the one end face 30; a further wavy recess is typically pressed into the second lower end face 30 unless a sheet metal part symmetrical with respect to the plane E is deliberately dispensed with or it is possible to form discrete projections 24 in the plane of symmetry such that a symmetrical sheet metal element 10 is present after all. A sheet metal element symmetrical with respect to the plane E is of advantage because on the use of a conveying and sorting device, in order to transport the sheet metal element into a press, care does not have to be taken with respect to which end face the respective sheet metal elements lie on which are lifted from a loose bulk onto the conveying path.

Although the projections 24 in the different shown embodiments are shown having tips formed with rather sharp edges, they can easily and without any disadvantage have slightly rounded tips or, on the whole, a form rounded in cross-section, i.e. in a radial plane.

The sheet metal elements are normally made from a conventional circular metal washer or the particular shape of the sheet metal element in accordance with the invention can be produced at the same time as the manufacture of the metal washer. However, it is not absolutely necessary for the sheet metal element 10 to be circular; it can have any desired external shape if this is expedient, for example, the external shape can be polygonal or elliptical in the plan view.

Figure 3:
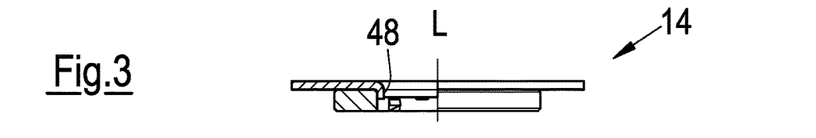
FIG. 3 a partly sectioned side view of a first component assembly including the sheet metal part of FIG. 1 and the sheet metal element of FIG. 2.

FIG. 3 now shows a sheet metal part 16 of which only a portion is shown in FIG. 1 (i.e. FIG. 1 only shows a portion of a typically substantially larger sheet metal part which is frequently shaped three-dimensionally, with, however, the region in which a fastening element is attached as a rule lying in a plane). In FIG. 3, the sheet metal part 10 is formed into a first component assembly 14 with the sheet metal element 10 in accordance with FIG. 2 or FIGS. 5A to 5D. For this purpose, the sheet metal part 10 is provided with an aperture 44 whose border 46 is shaped into a collar 48 which projects from the plane of the sheet metal part. The collar 48 is formed into the hole 12 of the sheet metal element 10 and is brought into engagement with at least the undercuts 22 at the one side of the central plane E, i.e. with the projections 24 which form the undercuts 22. The projections are then reflected in the outer surface of the collar 48; i.e. they engage there in a shape locked manner, whereby the sheet metal element is captively attached to the sheet metal part.

The attachment of the sheet metal part 40 to the sheet metal element 10 can take place in a press in which the sheet metal part is carried on the lower tool of the press or on an intermediate plate of the press, whereas a form punch is carried by the intermediate plate of the press of by the upper tool of the press. A possible shape of the form punch 50 can be seen from FIG. 7. There it can be seen that the form punch has a conically converging part 52 which is provided for the pulling of the sheet metal material, which is present around the aperture 44, to the collar 48 and which is simultaneously provided so that the material of the collar is radially widened and is brought into engagement with the projections 24 or into the undercuts. In this respect, the sheet metal element is held and/or supported at a flat surface of the corresponding tool or in an end-face recess of a die (not shown).

Figure 7:
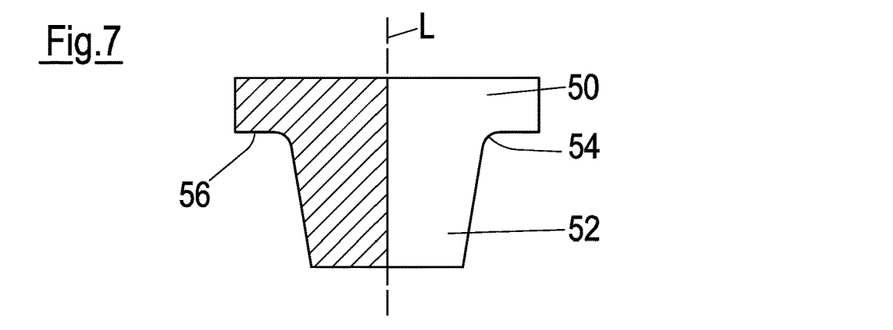
FIG. 7 a partly sectioned view of a punch which is configured for forming the collar of the sheet metal part in accordance with FIG. 3.

The radius 54 of the form punch 50 ensures that the sheet metal material of the sheet metal part 40 is gently bent around the peripheral edge of the hole margin and is not cut in. It is useful if said edge is designed as rounded and this naturally also applies to the corresponding edge at the other side of the sheet metal part. The peripheral ring surface 56 of the form punch 50 ensures that the sheet metal part contacts the other end face of the sheet metal element 10.

Instead of the described configuration of a press, in order to join the sheet metal part and the sheet metal element to one another, a reverse arrangement can be used in which the form punch projects upwardly and is carried by the lower tool of the press or by the intermediate plate of the press, while the sheet metal element 10 is then carried by the intermediate plate or by the upper tool of the press. A robot or force operated tongs could also be used for the joining of the sheet metal part 40 and the sheet metal element 10, wherein the form punch and a support for the sheet metal element 10 as well as a holder for the sheet metal part 16 can also be used in this case.

It should also be expressed at this point that the form punch 50 is not necessarily only able to be used for the deformation of the pre-punched sheet metal part 40 and for the shape-locked joining of the sheet metal part 40 and the sheet metal element 10; it can also be configured as a hole punch and can simultaneously be used for punching the sheet metal part 40. This would then typically take place in cooperation with a die (not shown) which supports the sheet metal element and which has a central passage for the removal of the punching slug. The central passage of the die would then be provided with a diameter larger than the diameter of the front end of the hole punch, which facilitates the formation of the collar and the removal of the punching slug.

Figure 8:
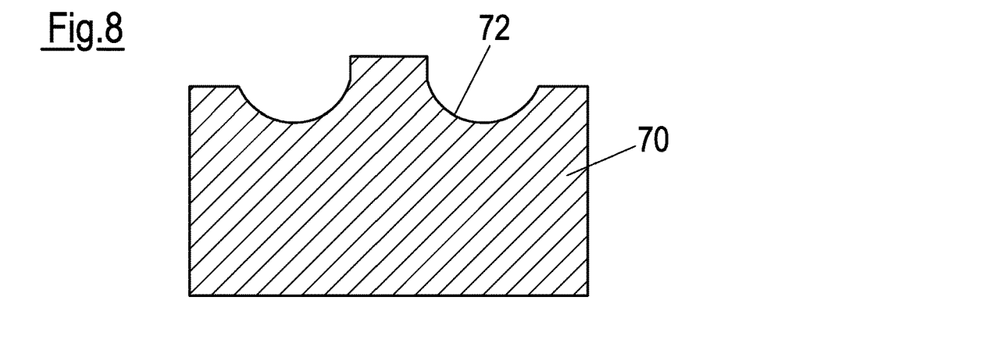
FIG. 8 a sectioned illustration of a die which is configured for forming the rivet bead of the rivet element in accordance with FIG. 4B.

The first component assembly 14, including the sheet metal part 16 and the sheet metal element 10, is subsequently joined with a rivet element 18 in accordance with FIGS. 4A and 4B. For this purpose, the rivet element 18 is provided with a head part 62 of larger diameter, which serves as a thread carrier and which forms a sheet metal contact surface 64, as well as with a hollow cylindrical rivet section 66 of smaller diameter which projects from the head part 62 at the side of the sheet metal contact surface 64. On the joining with the first component assembly 14, the rivet section 66 extends through the aperture 44 and the collar 48 of the sheet metal part as well as through the hole 12 of the sheet metal element 10 and is shaped into an at least L-shaped, preferably U-shaped, rivet bead 68 at the side of the sheet metal element 10 remote from the sheet metal part 16, with the sheet metal contact surface 64 contacting the side of the sheet metal part remote from the sheet metal element. This attachment of the rivet element 60 onto the first component assembly, for forming the completed component assembly, takes place in a manner known per se using a setting head for the rivet element 18 and a riveting die button for forming the rivet bead 68. A possible form for the riveting die button 70 is shown in FIG. 8, wherein the peripheral rolling surface 72 is responsible for the beading over the lower end of the initially cylindrical rivet section 66 to form the rivet bead.

Analogously to the attachment of the sheet metal part 40 to the sheet metal element 10, the attachment of the rivet element 60 to the first component assembly 72 can take place in a press or with the aid of a robot or force operated tongs.

Having regard to the completed component assembly, it is advantageous if the rivet bead 68 radially overlaps the sheet metal element 10 at the end face of the sheet metal element 10 remote from the sheet metal part 40, measured from the hole margin 20, by at least the radial thickness of the cylindrical rivet section 66.

The rivet element 18 is preferably provided with features providing security against rotation 69 in the region of the sheet metal contact surface 64 and/or in the region of the rivet section 66, said features providing security against rotation being reflected in the sheet metal part 16 or in its collar 48 and ensuring the attachment of the rivet element 60 to the sheet metal part 16 in a manner secure against rotation.

The rivet element 18—as shown—can be a nut element whose inner thread is provided in the head part or is supported by said head part.

Figure 9:
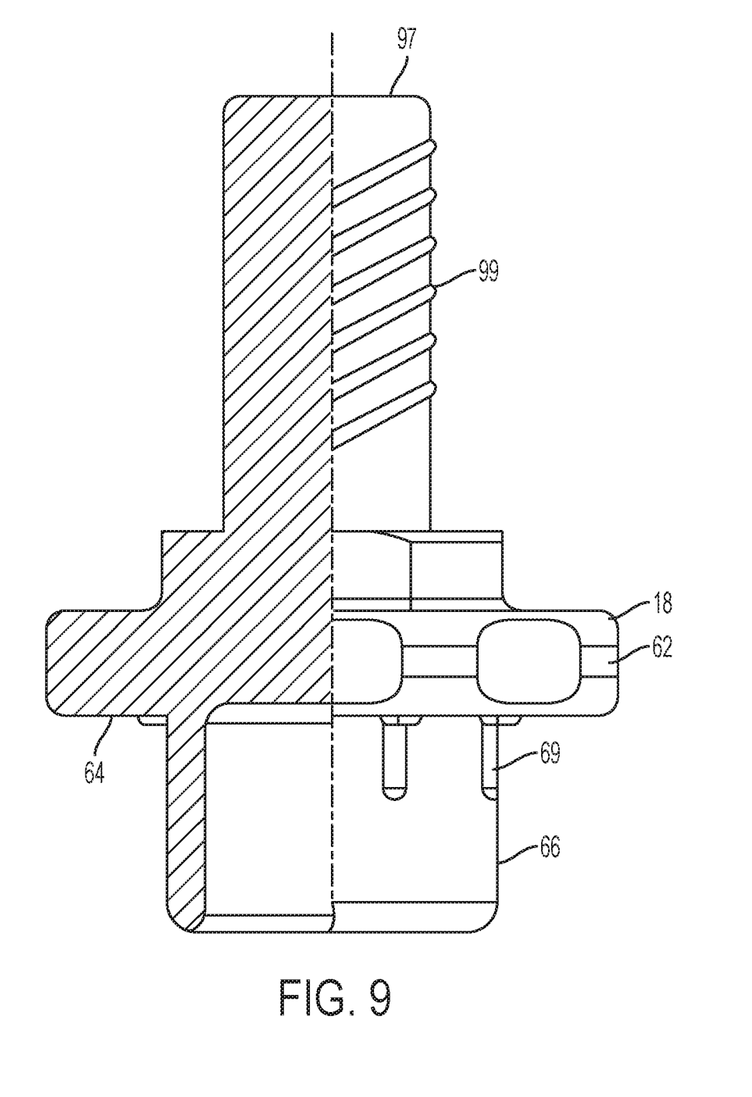
FIG. 9 a partly sectioned illustration of the rivet element according to another aspect of the disclosure.

Alternatively to this, the rivet element can be a bolt element (FIG. 9) whose shaft part which has an external thread projects away from or is supported by the head part at the side remote from the rivet section.

The method in accordance with the invention of manufacturing the first component assembly is characterized in that the sheet metal part 16 is punched, is reshaped to form the collar 48 and is brought radially toward the hole margin 20 and brought into engagement with the undercut 22 or with the undercuts 22 or with at least some of the undercuts 22.

The method in accordance with the invention in accordance with claim 13 of manufacturing the finished component assembly proceeds in such a manner that the cylindrical rivet section 66 of the rivet element 60 is guided from the side of the sheet metal part 40 remote from the sheet metal element 10 through its aperture 44 and collar 48 and through the hole 12 of the sheet metal element 10 until the sheet metal contact surface 64 contacts the sheet metal part 16 and the features providing security against rotation 69 move into engagement with the sheet metal part 16 and/or the inner side of the collar 48 and in that the region of the rivet section 66 is shaped into an at least L-shaped, preferably U-shaped, rivet bead 68 at the side of the sheet metal element 10 remote from the sheet metal part 16, with the rivet bead 68 radially overlapping the end face 30 of the sheet metal element 10 remote from the sheet metal part 16, when measured from the hole margin 20, by at least the radial thickness of the cylindrical rivet section 66.

LIST OF REFERENCE NUMERALS 10 sheet metal element
12 hole
14 first component assembly
16 sheet metal part
18 rivet element
20 hole margin
22 undercut
24 projection
28 recess
30 end face
32 impression, recess extending in wave shape
44 aperture
46 border
48 collar
50 form punch
52 conically converging part 54 radius
56 ring surface
60 inner thread
62 head part
64 sheet metal contact surface
66 rivet section
68 rivet bead
69 features providing security against rotation
70 riveting die button
72 rolling surface
74 finished component assembly
L longitudinal axis, central longitudinal axis of the hole, of the aperture and of the rivet element
E plane

The invention claimed is:

1. A sheet metal element (10) having a hole (12) for use in a component assembly (74) with a sheet metal part (16) and a rivet element 18, wherein a hole margin (20) of the sheet metal element (10) is provided with at least one a plurality of radially inwardly directed projections (24), each of the plurality of radially inwardly directed projections forming an undercut (22), the sheet metal element being a planar element, the undercut(s)undercuts (22) formed by respective wedge-shaped recesses (28) extending radially to the central longitudinal axis (L) of the hole (12) in at least one end face (30) of the sheet metal element (10), with the greatest depth being present at the hole margin (20), wherein the plurality of radially inwardly directed projections (24) which form undercuts (22) are provided at both sides of the plane (E).

2. A sheet metal element (10) in accordance with claim 1, wherein the undercuts (22) are in the hole margin at both sides with respect to a plane of symmetry (E) which is perpendicular to a central longitudinal axis (L) of the hole (12) at half of a height of the hole (12).

3. A sheet metal part (16) for use in a component assembly (74) having the sheet metal element (10) in accordance with claim 1, wherein the sheet metal part (16) is provided with an aperture (44) whose border (45) is shaped into a collar (48) which projects from the plane of the sheet metal part (16), which is formed into the hole (12) of the sheet metal element (10) and which is in engagement with at least one undercut (22), whereby the sheet metal element (10) is captively attached to the sheet metal part (16).

4. A sheet metal element (10) in accordance with claim 1 and having the shape of a circular metal washer.

5. A sheet metal element (10) having a hole (12) for use in a component assembly (74) with a sheet metal part (16) and a rivet element 18, wherein a hole margin (20) of the sheet metal element (10) is provided with a plurality of radially inwardly directed projections (24), each of the plurality of radially inwardly directed projections forming an undercut (22), the sheet metal element being a planar element, wherein each of the undercuts (22) is formed by at least one impression (32) which extends in wave shape about the central longitudinal axis (L) and which is provided in at least one end face (30) of the sheet metal element adjacent to the hole margin (20).

6. A sheet metal element (10) in accordance with claim 5, wherein at least one undercut (22) is provided in the hole margin at both sides with respect to a plane of symmetry (E) which is perpendicular to a central longitudinal axis (L) of the hole (12) at half of a height of the hole (12).

7. A sheet metal element (10) in accordance with claim 5, wherein the plurality of radially inwardly directed projections (24) which form undercuts (22) are provided at both sides of the plane (E).

8. A sheet metal element (10) having a hole (12) for use in a component assembly (74) with a sheet metal part (16) and a rivet element 18, wherein a hole margin (20) of the sheet metal element (10) is provided with at least one a plurality of radially inwardly directed projections (24), each of the plurality of radially inwardly directed projections forming an undercut (22), the sheet metal element being a planar element, the undercut(s)undercuts (22) formed by respective wedge-shaped recesses (28) extending radially to the central longitudinal axis (L) of the hole (12) in at least one end face (30) of the sheet metal element (10), with the greatest depth being present at the hole margin (20), the sheet metal element having the shape of a circular metal washer.

9. A sheet metal element (10) in accordance with claim 8, wherein the undercuts (22) are in the hole margin at both sides with respect to a plane of symmetry (E) which is perpendicular to a central longitudinal axis (L) of the hole (12) at half of a height of the hole (12).

10. A sheet metal part (16) for use in a component assembly (74) having the sheet metal element (10) in accordance with claim 8, wherein the sheet metal part (16) is provided with an aperture (44) whose border (45) is shaped into a collar (48) which projects from the plane of the sheet metal part (16), which is formed into the hole (12) of the sheet metal element (10) and which is in engagement with at least one undercut (22), whereby the sheet metal element (10) is captively attached to the sheet metal part (16).

11. A component assembly (74) comprising:
a sheet metal element having a hole, a hole margin (20) of the sheet metal element (10) is provided with at least one radially inwardly directed projection (24), the radially inwardly directed projection forming an undercut (22);
a sheet metal part provided with an aperture (44) whose border (45) is shaped into a collar (48) which projects from the plane of the sheet metal part (16), which is formed into the hole (12) of the sheet metal element (10) and which is in engagement with the undercut (22), whereby the sheet metal element (10) is captively attached to the sheet metal part (16); and
a rivet element (18), wherein the rivet element (18) is provided with a head part (62) of larger diameter, which serves as a thread carrier and which forms a sheet metal contact surface (64), as well as with a hollow cylindrical rivet section (66) of smaller diameter which projects from the head part (62) at the side of the sheet metal contact surface (64), which extends through the aperture (44) and the collar (48) of the sheet metal part (16) as well as through the hole (12) of the sheet metal element and which is shaped into a rivet bead (68) at the side of the sheet metal element (10) remote from the sheet metal part, with the sheet metal contact surface (64) contacting the side of the sheet metal part (16) remote from the sheet metal element (10).

12. A component assembly (74) in accordance with claim 11, wherein the rivet bead (68) radially overlaps the sheet metal element (10) at the end face (30) of the sheet metal element (10) remote from the sheet metal part (16), measured from the hole margin (20), by at least the radial thickness of the cylindrical rivet section (66).

13. A component assembly (74) in accordance with claim 11, wherein the rivet element (18) is provided with features providing security against rotation (69) in at least one of the region of the sheet metal contact surface (64) and the region of the rivet section (66), said features providing security against rotation being reflected in the sheet metal part (16) or in its collar (48) and ensuring the attachment of the rivet element (18) to the sheet metal part (16) in a manner secure against rotation.

14. A component assembly (74) in accordance with claim 11, wherein the rivet element 18 is a nut element whose inner thread (60) is provided in the head part (62) or is supported by said head part.

15. A component assembly in accordance with claim 11, wherein the rivet element is a bolt element whose shaft part having an external thread projects away from or is carried by the head part at the side remote from the rivet section.

* * * * *

UNITED STATES PATENT AND TRADEMARK OFFICE
CERTIFICATE OF CORRECTION

PATENT NO.         : 10,197,079 B2
APPLICATION NO.    : 15/049655
DATED              : February 5, 2019
INVENTOR(S)        : Jiri Babej, Oliver Diehl and Richard Humpert Page 1 of 1

It is certified that error appears in the above-identified patent and that said Letters Patent is hereby corrected as shown below:

In the Claims

Column 9, Line 19: Claim 1 Delete "at least one"

Column 9, Line 23: Claim 1 Delete "undercut(s)"

Column 10, Line 4: Claim 8 Delete "at least one"

Column 10, Line 8: Claim 8 Delete "undercut(s)"

Signed and Sealed this
Third Day of September, 2019

Andrei Iancu
*Director of the United States Patent and Trademark Office*